(12) United States Patent
Ishikawa et al.

(10) Patent No.: US 7,194,486 B2
(45) Date of Patent: Mar. 20, 2007

(54) METHOD AND SYSTEM FOR DATA PROCESSING WITH DATA REPLICATION FOR THE SAME

(75) Inventors: Taichi Ishikawa, Yokohama (JP); Nobuo Kawamura, Atsugi (JP)

(73) Assignee: Hitachi, Ltd., Tokyo (JP)

( * ) Notice: Subject to any disclaimer, the term of this patent is extended or adjusted under 35 U.S.C. 154(b) by 89 days.

(21) Appl. No.: 10/932,100

(22) Filed: Sep. 2, 2004

(65) Prior Publication Data
US 2006/0004877 A1   Jan. 5, 2006

(30) Foreign Application Priority Data
Jun. 3, 2004 (JP) .............. 2004-165250

(51) Int. Cl.
G06F 12/00 (2006.01)
G06F 17/30 (2006.01)

(52) U.S. Cl. .................................... 707/200
(58) Field of Classification Search ............. 707/100, 707/200 S, 1–20
See application file for complete search history.

(56) References Cited

U.S. PATENT DOCUMENTS

| | | | |
|---|---|---|---|
| 5,873,096 A | 2/1999 | Lim et al. | 707/201 |
| 6,061,683 A * | 5/2000 | Alonso | 707/8 |
| 6,199,074 B1 * | 3/2001 | Kern et al. | 707/204 |
| 6,615,223 B1 | 9/2003 | Shih et al. | 707/201 |
| 6,823,336 B1 | 11/2004 | Srinivasan et al. | 707/8 |
| 6,859,811 B1 | 2/2005 | Chandrasekaran et al. | 707/200 |
| 2004/0030703 A1* | 2/2004 | Bourbonnais et al. | 707/100 |
| 2005/0027759 A1 | 2/2005 | Tsuchlya et al. | |
| 2005/0071389 A1 | 3/2005 | Gupta | 707/204 |
| 2005/0114285 A1 | 5/2005 | Cincotta | 707/1 |
| 2006/0041598 A1 | 2/2006 | Yamaguchi et al. | |

FOREIGN PATENT DOCUMENTS

| | | |
|---|---|---|
| JP | 08-185346 | 7/1996 |
| JP | 08185346 | 7/1996 |
| JP | 2000-112801 | 4/2000 |
| JP | 2000112801 | 4/2000 |
| JP | 2000-347811 | 12/2000 |
| JP | 2000347811 | 12/2000 |

* cited by examiner

Primary Examiner—John Cottingham
Assistant Examiner—Dennis Vautrot
(74) Attorney, Agent, or Firm—Antonelli, Terry, Stout and Kraus, LLP.

(57) ABSTRACT

A data processing apparatus includes a storage device having a replication generation function for replicating a data base to create a replication data base, and stores data and a plurality of log information in transaction processing that uses the data in the storage device, selects a transaction that is performing a data operation without meeting a predetermined condition after synchronization between the data base and the replication data base is released, and performs the data operation cancellation processing to the replication data base by the selected transaction. It also selects a transaction, which meets the predetermined condition and is not performing a data operation to the replication data base, to perform a data operation to the replication data base with the selected transaction. It then becomes possible to reduce the burden for the data processing apparatus during using the replication data base.

20 Claims, 17 Drawing Sheets

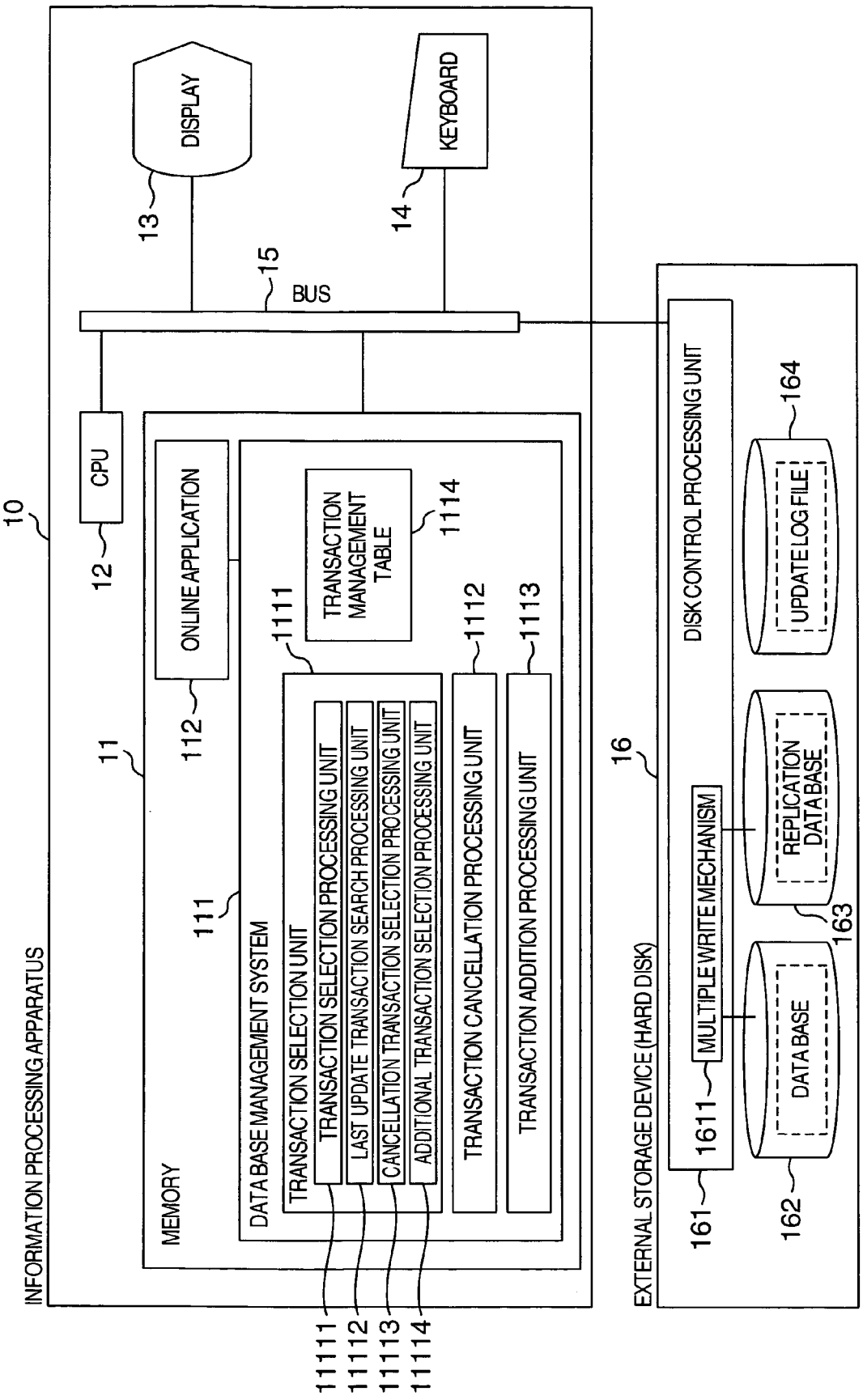

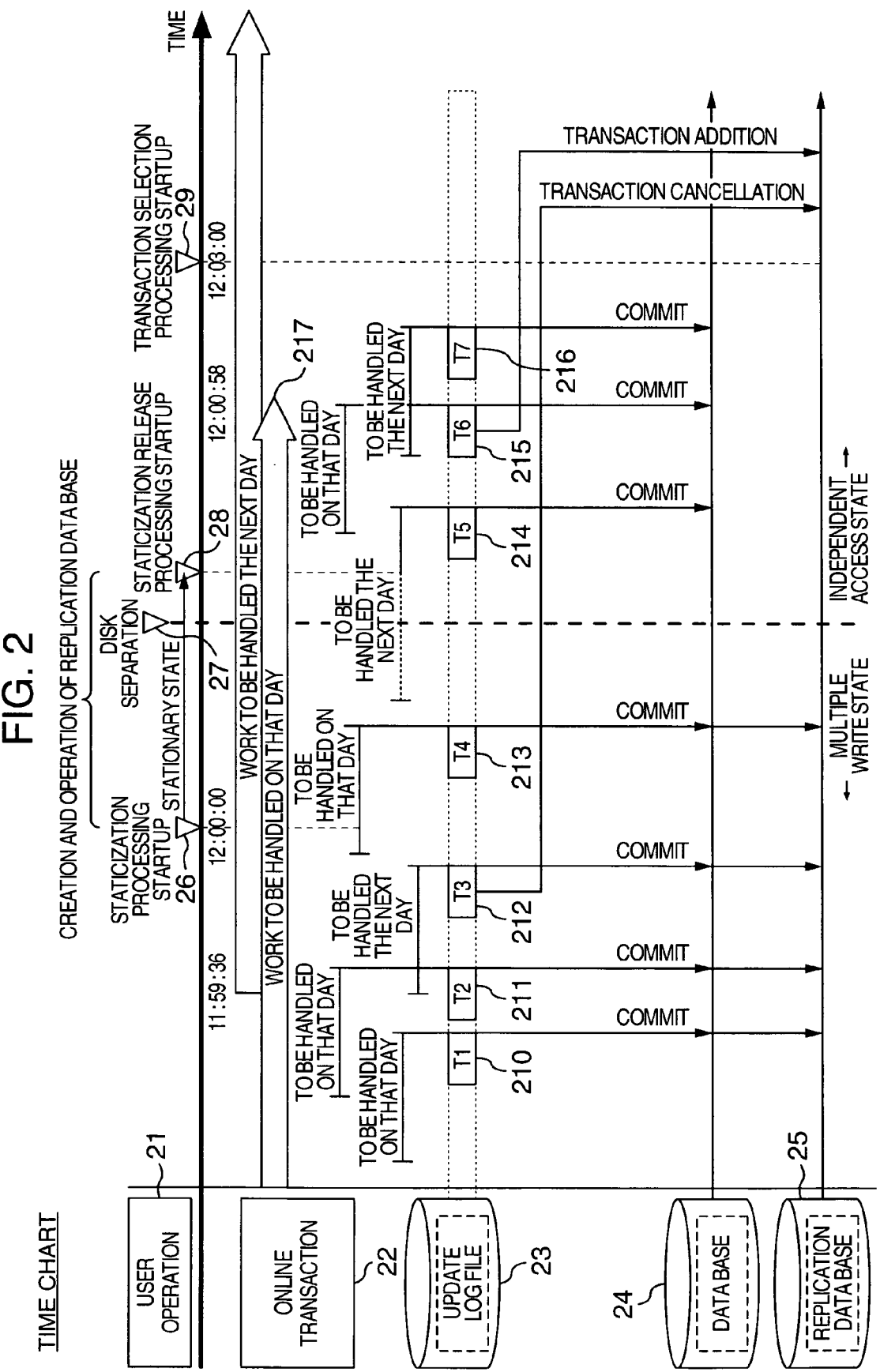

FIG. 3

CONFIGURATION OF UPDATE LOG FILE

30 UPDATE LOG FILE

| | 31 UPDATE TIME | 32 LOG SEQUENCE NUMBER | 33 TRANS-ACTION ID | 34 OPERATION CORD | 35 3534 UPDATE INFORMATION ||||||||
|---|---|---|---|---|---|---|---|---|---|---|---|---|
| | | | | | 351 TABLE NAME | 352 COLUMN NUMBER | 353 COLUMN INFORMATION (1) ||| ... | 3534 COLUMN INFORMATION (n) |||
| | | | | | | | 3531 COLUMN NAME | 3532 DATA LENGTH | 3533 PRE-UPDATE DATA | POST-UPDATE DATA | | COLUMN NAME | DATA LENGTH | PRE-UPDATE DATA | POST-UPDATE DATA |

| UPDATE TIME | LOG SEQ # | TXN ID | OPERATION | TABLE NAME | COLUMN NUMBER | COLUMN NAME | DATA LENGTH | PRE-UPDATE DATA | POST-UPDATE DATA | ... | COLUMN NAME | DATA LENGTH | PRE-UPDATE DATA | POST-UPDATE DATA |
|---|---|---|---|---|---|---|---|---|---|---|---|---|---|---|
| ...115906 | 43 | T1 | BIGIN | - | - | - | - | - | - | ... | - | - | - | - |
| ...115911 | 44 | T1 | INSERT | TA | 3 | C1 | 8 | - | 20031016 | ... | C3 | 4 | - | ABCD |
| ...115916 | 45 | T2 | BIGIN | - | - | - | - | - | - | ... | - | - | - | - |
| ...115921 | 46 | T1 | COMMIT | - | - | - | - | - | - | ... | - | - | - | - |
| ...115926 | 47 | T2 | INSERT | TA | 3 | C1 | 8 | - | 20031017 | ... | C3 | 4 | - | EFGH |
| ...115931 | 48 | T2 | COMMIT | - | - | - | - | - | - | ... | - | - | - | - |
| ...115936 | 49 | T3 | BIGIN | - | - | - | - | - | - | ... | - | - | - | - |
| ...115941 | 50 | T3 | INSERT | TA | 3 | C1 | 8 | - | 20031017 | ... | C3 | 4 | - | IJKL |
| ...115946 | 51 | T3 | UPDATE | TB | 5 | C4 | 4 | ABCD | CDEF | ... | C9 | 1 | F | T |
| ...115951 | 52 | T3 | COMMIT | - | - | - | - | - | - | ... | - | - | - | - |
| ...115956 | 53 | T4 | BIGIN | - | - | - | - | - | - | ... | - | - | - | - |
| ...120003 | 54 | T4 | INSERT | TA | 3 | C1 | 8 | - | 20031016 | ... | C3 | 4 | - | MNOP |
| ...120008 | 55 | T4 | DELETE | TC | 2 | C10 | 4 | HJK | - | ... | - | - | - | - |
| ...120013 | 56 | T4 | COMMIT | - | - | - | - | - | - | ... | - | - | - | - |
| ...120028 | 57 | T5 | BIGIN | - | - | - | - | - | - | ... | - | - | - | - |
| ...120033 | 58 | T5 | INSERT | TA | 3 | C1 | 8 | - | 20031017 | ... | C3 | 4 | - | QRST |
| ...120038 | 59 | T6 | BIGIN | - | - | - | - | - | - | ... | - | - | - | - |
| ...120043 | 60 | T6 | INSERT | TA | 3 | C1 | 8 | - | 20031016 | ... | C3 | 4 | - | UVWX |
| ...120048 | 61 | T5 | COMMIT | - | - | - | - | - | - | ... | - | - | - | - |
| ...120053 | 62 | T7 | BIGIN | - | - | - | - | - | - | ... | - | - | - | - |
| ...120058 | 63 | T6 | COMMIT | - | - | - | - | - | - | ... | - | - | - | - |
| ...120103 | 64 | T7 | INSERT | TA | 3 | C1 | 8 | - | 20031017 | ... | C3 | 4 | - | YZAB |
| ...120108 | 65 | T7 | COMMIT | - | - | - | - | - | - | ... | - | - | - | - |

CONFIGURATION DATA BASE

DIAGRAM OF DB-DISK CONFIGURATION

FIG. 16

DB-DISK BLOCK CONVERSION TABLE

| 1601 | 1602 | 1603 | 1604 | 1605 | 1606 | 1607 |
|---|---|---|---|---|---|---|
| DATA BASE AREA ID | FILE ID | BLOCK LENGTH | LOGICAL VOLUME ID | DISK CONTROL DEVICE NUMBER | PHYSICAL DEVICE ID (LUN) | RELATIVE POSITION (LBA) |
|  |  |  |  |  |  |  |
|  |  |  |  |  |  |  |
|  |  |  |  |  |  |  |

METHOD AND SYSTEM FOR DATA PROCESSING WITH DATA REPLICATION FOR THE SAME

INCORPORATION BY REFERENCE

The present application claims priority from Japanese application JP2004-165250 filed on Jun. 3, 2004, the content of which is hereby incorporated by reference into this application.

BACKGROUND OF THE INVENTION

The present invention relates to a data processing technology for making a data replication.

In an online work that conducts a lot of transactions, aggregation of a large amount of data, which requires daily or monthly operations, and the like, are obstructive to a 24-hour continuous operation. In other words, the batch processing for these works, which involves a batch access to the data base that is used in the online work, has a considerable effect on online work processing.

As a solution thereof, a method is known, as disclosed in for example JP-A-2000-347811, in which a plurality of data management systems are placed on LAN (Local Area Network)/WAN (Wide Area Network), and an update content of the data base which is used in the online work is always transmitted and copied to another data base management system via a network, thus a replication of a data base for the online work being provided. It is possible to prevent burdens from falling on the online work side too much and to conduct the online work in parallel with batch processing by performing the foregoing batch processing on the replication data base side.

Another method is also known which utilizes a SAN (Storage Area Network) configuration, which has become widespread in recent years for general storage devices, or a configuration in which a plurality of external storage devices, such as a magnetic disc device and the like, are organically connected via a dedicated high speed network, to provide a replication (or may be referred to as a replica, a snap shot, or a shadow image) of the data base for the online work.

In the configuration, the external storage device, such as a storage device or the like, provides: a function of copying rapidly an arbitrary logical volume to a plurality of logical volumes; a function of performing multiple write of data assuming the arbitrary logical volume as an original volume and the plurality of logical volumes as a duplicate volume; a function of separating the logical volumes which are in a state of multiple write at an arbitrary point in time to allow the volumes to be accessed as an independent original or duplicate volume; and the like. In the data base replication created in such a scheme, the data base is copied to the data base replication based on a certain arbitrary time when the pair of the original and duplicate volumes was released. Therefore, transactions, which were conducted before that release time, are copied to the data base replication in an updated state.

SUMMARY OF THE INVENTION

When creating a replication of a data base on the basis of a certain arbitrary time, it is desirable to create the replication of the data base on the basis of a work requirement. The work requirement requires that, for example, even a transaction handled on that day be copied. It is desirable to create a replication data base which assures that a work is in a state of completion, including, for example, a slip data processing transaction for even that to be handled on that day. Further, it is desirable to utilize an added function, such as a high-speed copying function which is possessed by the external storage device, or the like, in the SAN environment.

It is an object of the present invention to create a replication data base based on a work requirement. It is another object of the present invention to define the work requirement for the user of the data base in an arbitrary way. It is still another object to provide an information processing apparatus that has a system having a function of making a selection in accordance with the work requirement as to whether or not to copy the entire update content of the data base, which is updated in each transaction.

In order to achieve the above objects, transaction processing, which is not included in the replication data base created based on the certain arbitrary time, is added to the replication data base, and unnecessary transaction processing is removed from the data base replication in accordance with the work requirement defined by the data base user.

According to the present invention, it is possible to significantly reduce the burdens of data preparation and operation for batch work, such as aggregation of a large amount of data in the work processing that involves a 24-hour continuous operation. Especially in the SAN environment, the added function, such as a rapid copying function, provided with the external storage device can be utilized to minimize the effect on the online work.

BRIEF DESCRIPTION OF THE DRAWINGS

FIG. 1 is a diagram showing a system configuration of a first embodiment;

FIG. 2 is a diagram showing a time chart of the first embodiment;

FIG. 3 is a table showing a configuration of an update log file of the first embodiment;

FIG. 16 is a DB-disk block conversion table of the second embodiment; and

DESCRIPTION OF THE EMBODIMENTS

Figure 4:
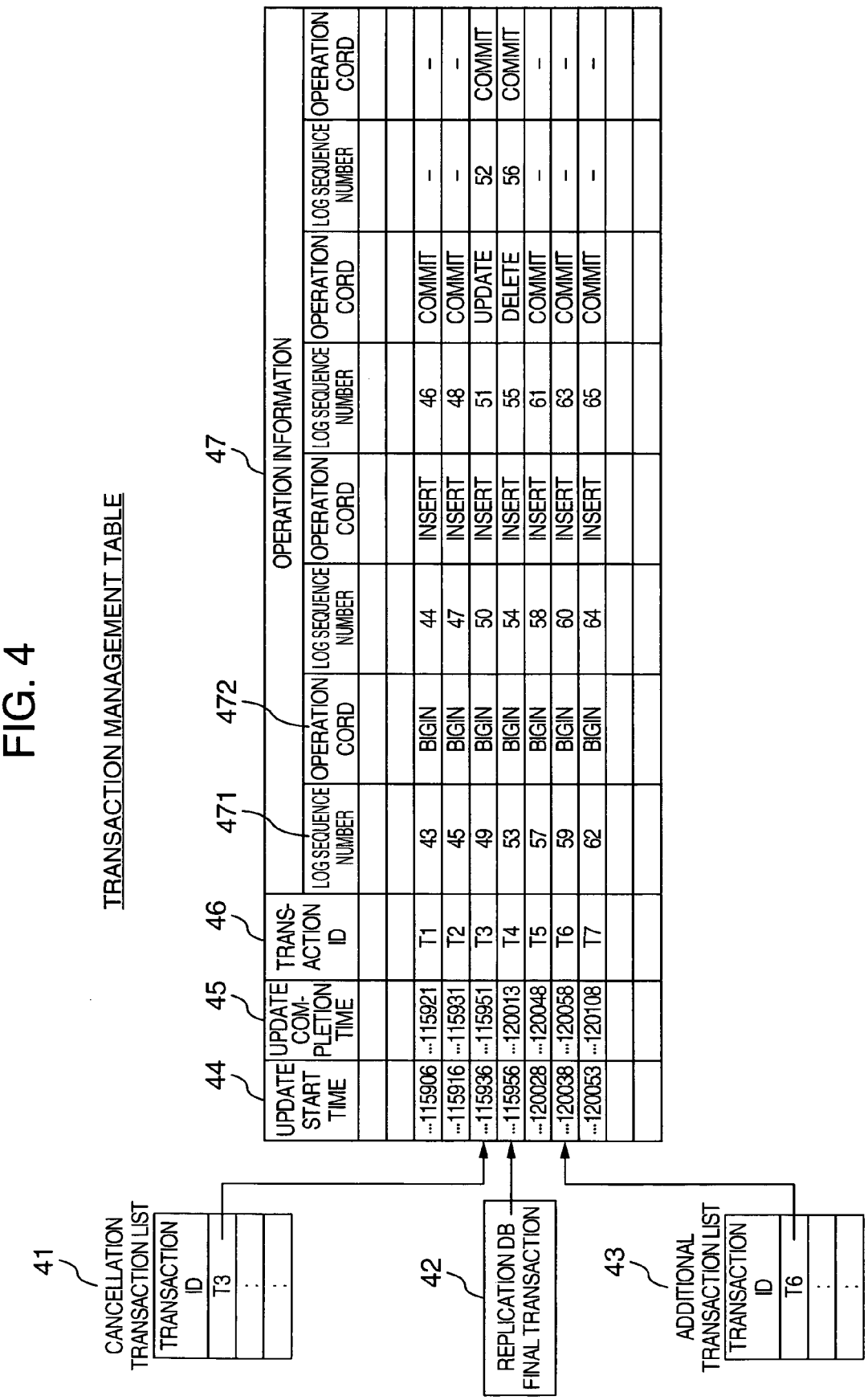
FIG. 4 is a transaction management table of the first embodiment.

Embodiments of the present invention will be described in detail below with reference to drawings.

(Embodiment 1)

FIG. 1 shows a system configuration of an information processing apparatus of an embodiment according to the present invention. In the embodiment, the system configuration is implemented by an information processing apparatus 10 and an external storage device 16 which are connected by a bus 15. The information processing apparatus 10 comprises a CPU 12, a memory 11, a display 13, and a keyboard 14. An online application (a business program or a program is also acceptable) 112 accesses a data base 162 on the external storage device 16 via a data management system 111. An update content of the data base 162 can be recorded on an update log file 164 as update history information, and can also be copied to a replication data base 163 in real time by a multiple write mechanism 1611 which is on a disk control processing unit 1661.

The multiple write mechanism 1611 can also release the multiple write or synchronization, that is, record of the contents of database 162 also into the replication database 163, at an arbitrary point in time. In other words, it can also record the content of the data base 162 on the replication data base 163 to allow the replication data base 163 to be read and written independently from the data base 162 via the data base management system 111. The data base management system 111 comprises: a transaction selection unit 1111 for selecting a transaction that meets a certain condition from the update log file 164; a transaction management table 1114 for managing the transaction; a transaction cancellation processing unit 1112 for canceling a transaction that does not meet the condition from the replication data base 163; and a transaction addition processing unit 1113 for adding a transaction that meets the condition to the replication data base 163. The transaction selection unit 1111 comprises: a transaction selection processing unit 11111; a last updated transaction search processing unit 11112; a cancellation transaction selection processing unit 11113; and an additional transaction selection processing unit 11114. The foregoing each processing unit, mechanism, and system can be implemented by a program, an object, a process, a thread, and hardware. While the data base management system has been described by way of an example in the present embodiment, the present invention is not limited thereto. It is applicable to general data processing that uses log information to perform failure recovery, as well as to a transaction monitor and a file system.

FIG. 2 is a time chart explaining a flow of creation processing of a replication data base that uses transaction selection processing. It shows a variation with time concerning how an update log file 23, a data base 24, and a replication data base 25 are updated by an online transaction 22 and a user operation 21.

Update contents of online transactions 210, 211, 212, and 213 are copied to the data base 24 and replication data base 25 by the multiple write mechanism 1611. In other words, during the time until the information processing apparatus 10 makes a separation request 27 to the external storage device 16, the update content of the data base 24 is also copied to the replication data base 25. In this manner, the content of the replication data base is kept updated.

Furthermore, after the information processing apparatus 10 makes the disk separation request 27, or a pair release request to the external storage device 16 at an arbitrary time, it becomes possible to access the replication data base independently. More specifically, the update content of the transactions 214, 215, and 216, which are started after the disk is separated, is applied only to the data base 24, and not to the replication data base 25. In this manner, it is possible to create the replication data base at high speed that includes the update content until an arbitrary time. It should be noted that the update of the data base 24 by the information processing apparatus 10, as stated above, is referred to as an application of update, while a change in the data of the replication data base 25 is referred to as a copy of the update content.

It is also possible to make a request to the data base management system asking a startup of data staticization processing 26 so as to keep the consistency with the transaction of the replication data base at the timing of disk separation. After the data staticization processing startup 26 is requested, the data base waits until the transaction 213, which has already been started at the time of the request, completes. When the transaction 213 completes, data base changes to a stationary state. The update of the transaction processing 214, which was newly started against the data base that changed from the start of staticization to a stationary state, is kept waiting by the data base management system. In other words, the transaction, which is being updated, is eliminated by changing the data base to a stationary state, thus making it possible to maintain the consistency with the transaction of the replication data base. Moreover, it is possible to minimize the wait state of the online transaction by quickly releasing 28 the stationary state after the disk separation request 27 was made.

In the embodiment shown in FIG. 2, the content of update of the transaction 212 that is handled the next day is copied to the replication data base that was created. The transaction 215 to be handled on that day is also started after the disk separation 27, and the update content is not copied to the replication data base. Here, the transaction that is handled on that day means one in a column C1 of a table TA, shown in FIG. 3, which is updated to a value of 20031016 or below.

When the transaction selection processing 29 is requested to the data base management system under the current situation, the transaction 212 that is handled the next day is cancelled from the replication data base 25, and the update content of the transaction 215 that is handled on that day is copied to the replication data base 25, thus making it possible to create a replication data base in which just the transaction processing to be handled on that day is completed. It should be noted that the request of the transaction selection processing 29 may be automatically made, for example after the execution of the staticization release processing 28, by the data base management system. Moreover, the online application 112 may determine the completion of the work 217 that is handled on that day, and may make the transaction selection processing 29 request.

FIG. 3 shows a configuration and a content of an update log file 30 of the transactions that were executed in accordance with the time chart of FIG. 2. The record of the update log file 30 is listed in each operation and in time sequence. The execution result of each operation includes update time 31, log sequence number 32, transaction ID 33, operation cord 34, and update information 35. The update information 35 includes table name 351, column number 352, and column information 353 of 352 columns. The column information 353 includes column name 3531, data length 3532, pre-update data 3533, and post-update data 3534.

FIG. 4 shows a transaction management table and content thereof, in which the record of the update log file of transaction, which is performed in accordance with the time chart of FIG. 2, is rearranged in transactions in stead of in operations. The transaction management table includes update start time 44, update completion time 45, transaction ID 46, and operation information 47. The operation information 47 includes log sequence number 471 and operation cord 472 in which only the number of relevant transactions is recorded. A last updated transaction ID of the replication data base is stored in a replication DB final transaction 42. A transaction ID which is cancelled from the replication data base is stored in a cancellation transaction list 41. A transaction ID which is copied to the replication data base is stored in an additional transaction list 43.

Figure 5:
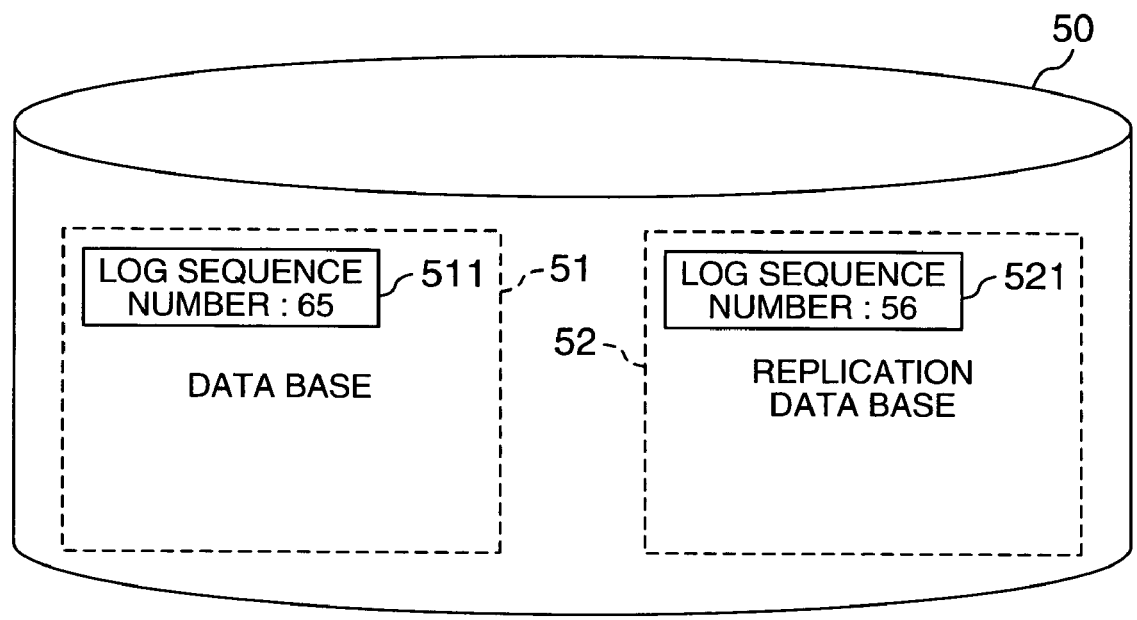
FIG. 5 is a diagram showing a configuration of a data base of the first embodiment.

FIG. 5 shows a configuration and update content of a data base which is updated in accordance with the time chart of FIG. 2. An external storage device 50 includes a logical volume 51 for storing a data base, and a logical volume 52 for storing a replication data base. In the logical volume 51 for storing the data base, a log sequence number 511, with which the data base is last updated, is stored. In the logical volume 52 for storing the replication data base, a log sequence number 521, with which the replication data base is last updated, is stored.

Figure 6:
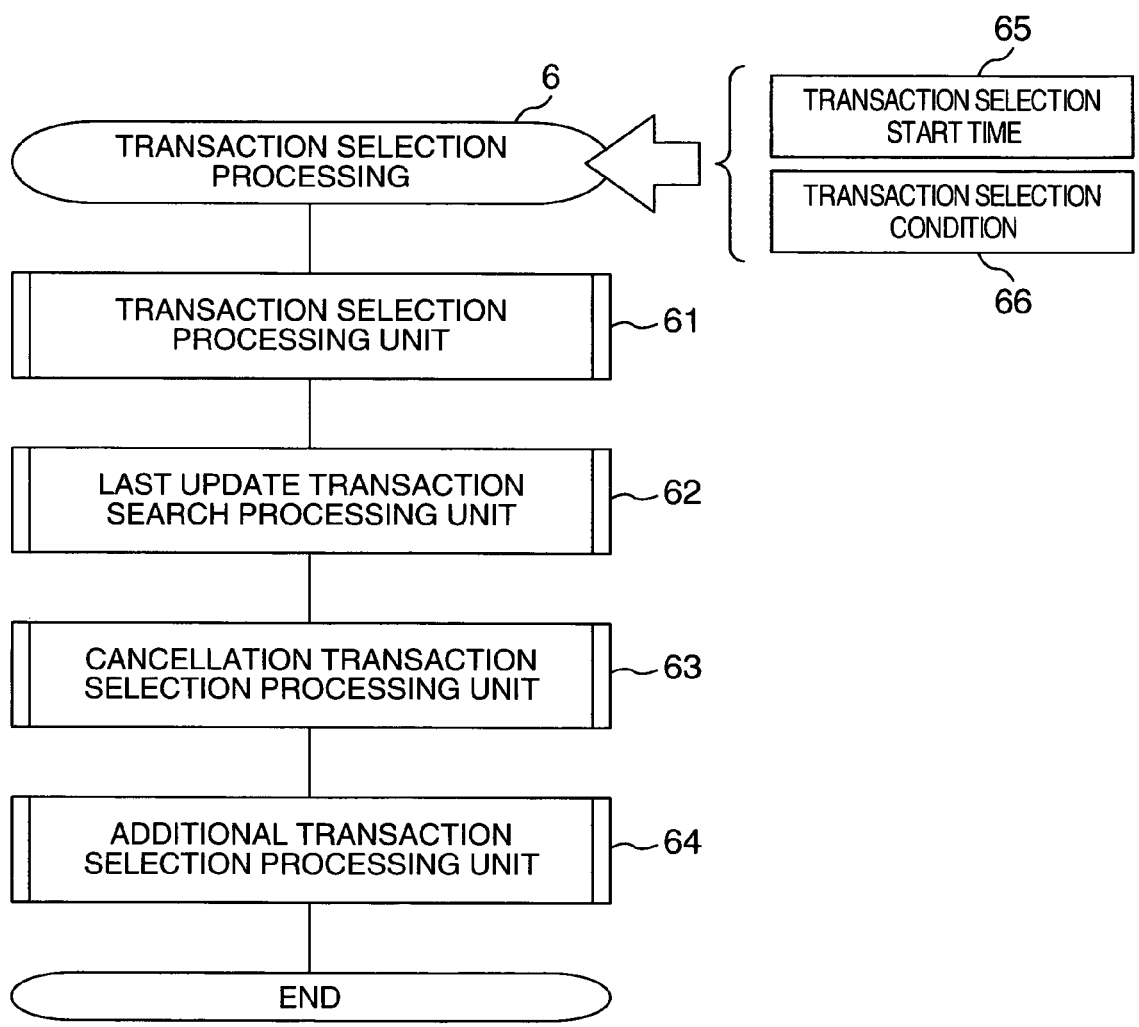
FIG. 6 a diagram showing transaction selection processing of the first embodiment.

FIG. 6 shows a flow of transaction selection processing. The transaction selection processing comprises: a transaction selection start time 65 which has been predetermined; a step 61 of selecting a transaction assuming a transaction selection condition 66, which has been predetermined, as input information; a step 62 of searching a last updated transaction; a step 63 of selecting a cancelled transaction; and a step 64 of selecting an additional transaction.

Figure 7:
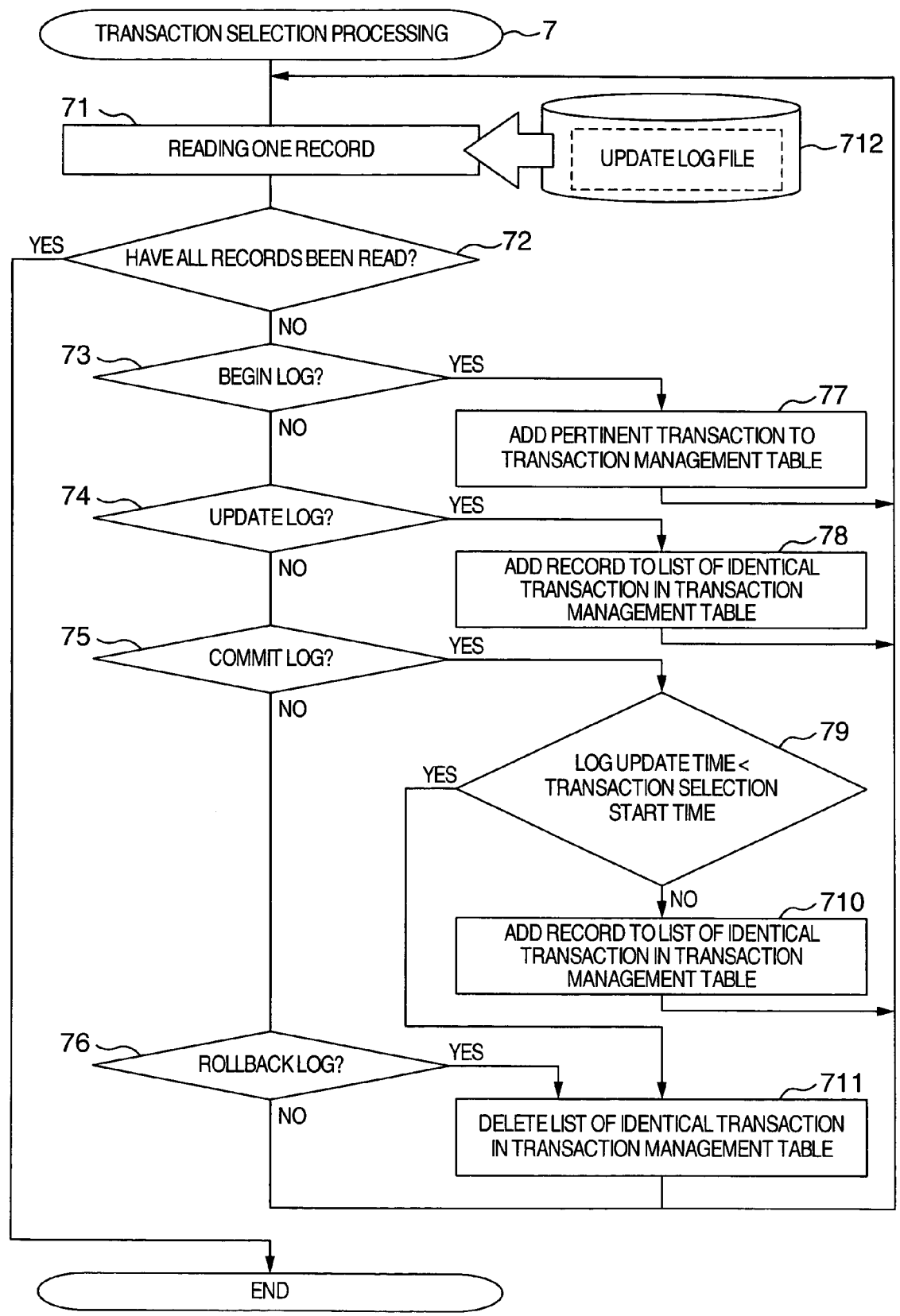
FIG. 7 a diagram showing transaction selection processing of the first embodiment.

FIG. 7 shows a flow of transaction selection processing. The transaction selection processing first reads one record from an updated log file 712 (step 71). A determination is made as to whether all have been read out (step 72). If so, the processing terminates. A determination is made as to whether an operation record 34 of the read out record is a BEGIN log (step 73). If so, a relevant transaction is added to the transaction management table (step 77). If it is an updated log (step 74), a record is added to a list of the same transactions of the transaction management table (step 78). If it is a COMMIT log (step 75), a comparison is made between a log update time 31 and a transaction selection start time 65 (step 79). If the log update time is earlier than the transaction selection start time, then the list of the same transactions in the transaction management table is deleted (step 711). If the log update time is the same as or larger than the transaction selection start time, then a record is added to the list of the same transactions in the transaction management table (step 710). If it is a ROLLBACK log (step 76), the list of the same transactions in the transaction management table is deleted (step 711).

Figure 8:
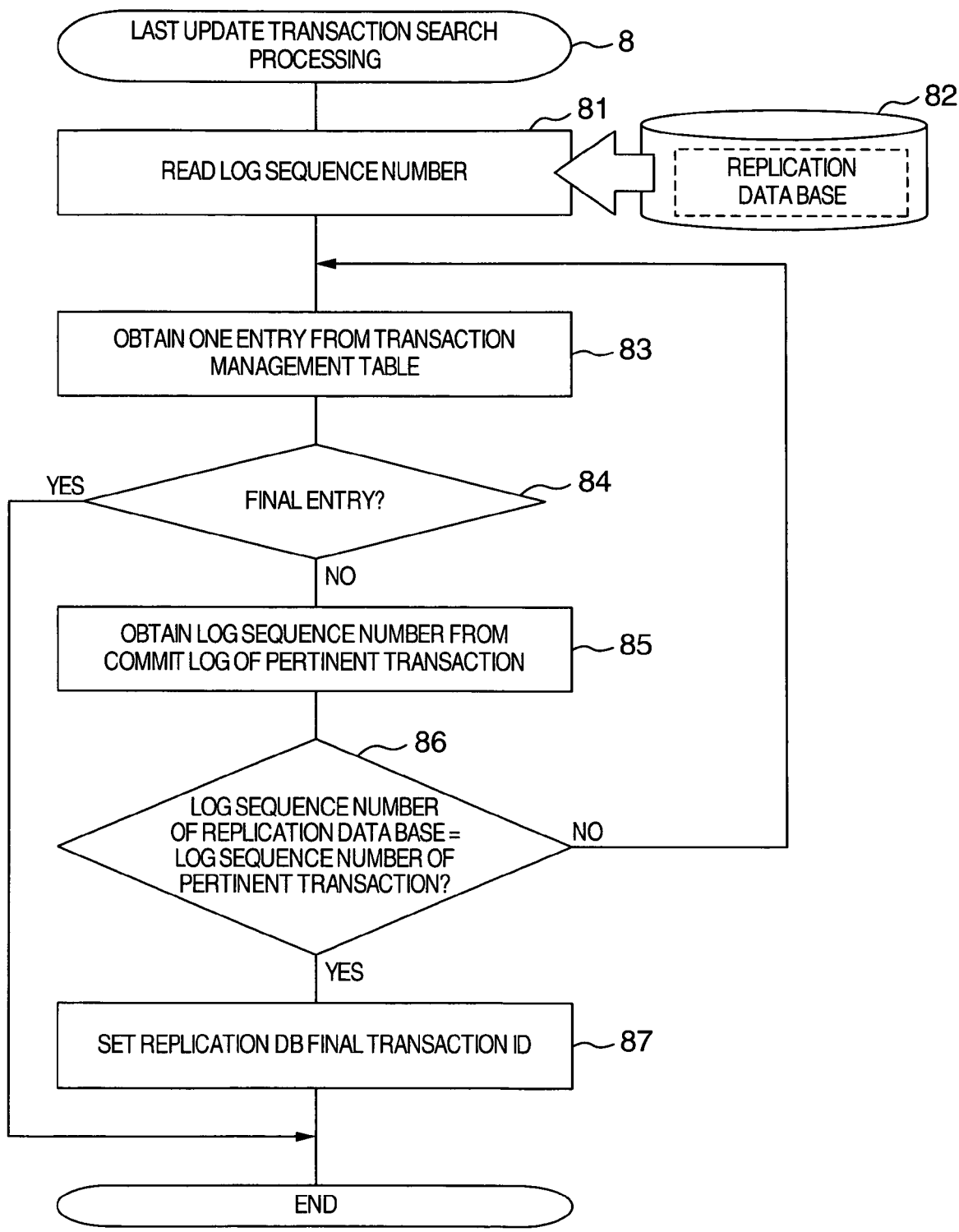
FIG. 8 is a diagram showing finally updated transaction search processing of the first embodiment.

FIG. 8 shows a flow of processing for searching a transaction ID of the transaction which is last updated in the replication data base. First, a log sequence number 521 is read from a replication data base 82 (step 81). Next, transactions are retrieved one by one from the transaction management table (step 83). If it is a final entry (step 84), the processing terminates. A sequence number 471 of a COMMIT log of a retrieved transaction is obtained (step 85). If the retrieved log sequence number does not match a log sequence number 521 of the replication data base (step 86), then the processing returns to step 83. If a match is found, the ID of the relevant transaction is set to a replication DB final transaction 42 (step 87).

Figure 9:
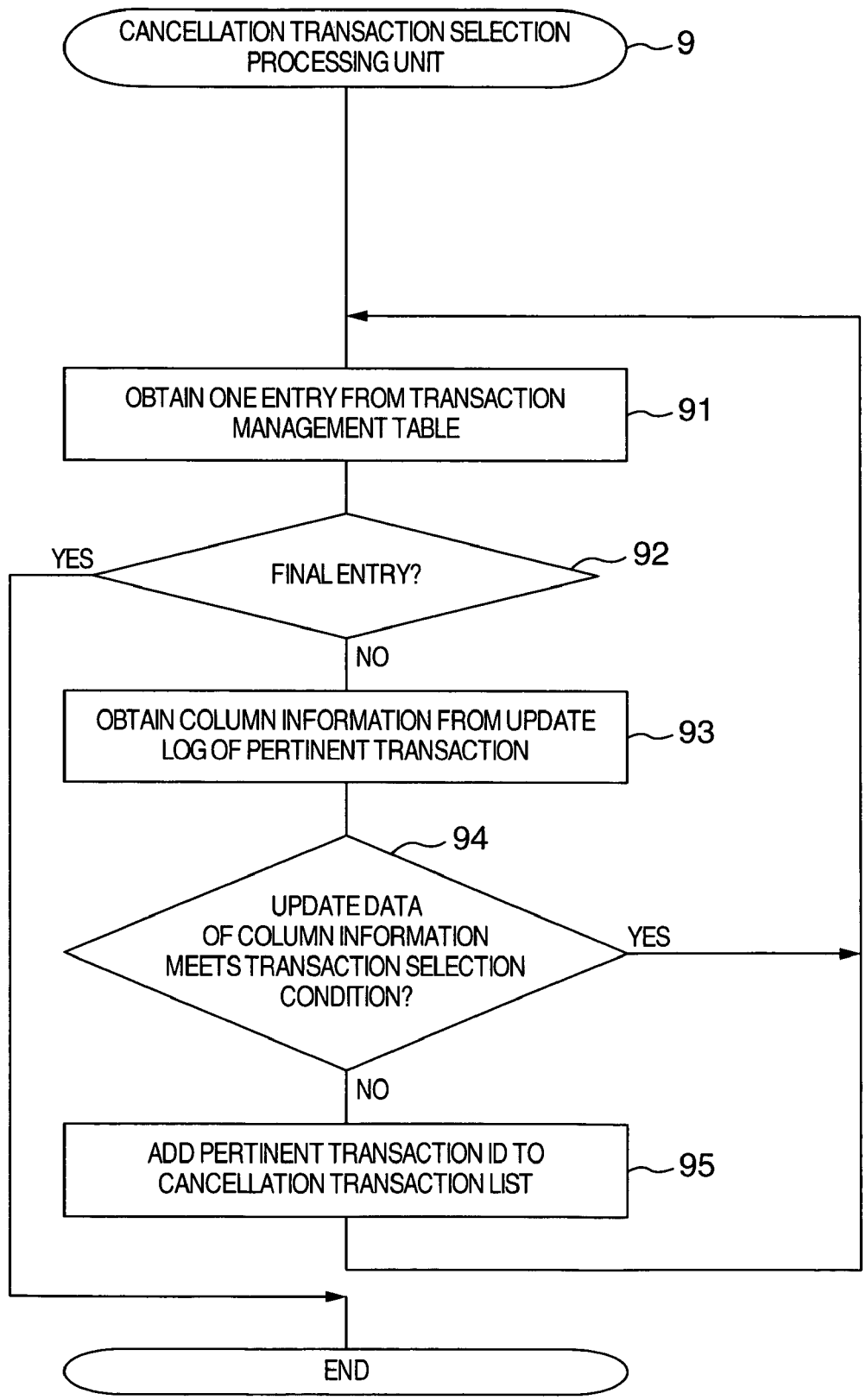
FIG. 9 is a diagram showing cancellation transaction selection processing of the first embodiment.

FIG. 9 shows a flow of processing for selecting a transaction to be cancelled from the replication data base. First, transactions are retrieved one by one from the management table (step 91). If it is a final entry (step 92), the processing terminates. Reference is made to the updated log of INSERT and UPDATE (step 93) from among operations 472 that are performed by the retrieved transaction to obtain update information of the relevant log. If obtained update information meets a transaction selection condition 66 (step 94), then the processing returns to step 91. If it does not meet it, the relevant transaction ID is added to a cancellation transaction list 41 (step 95) and the processing return to step 91.

Figure 10:
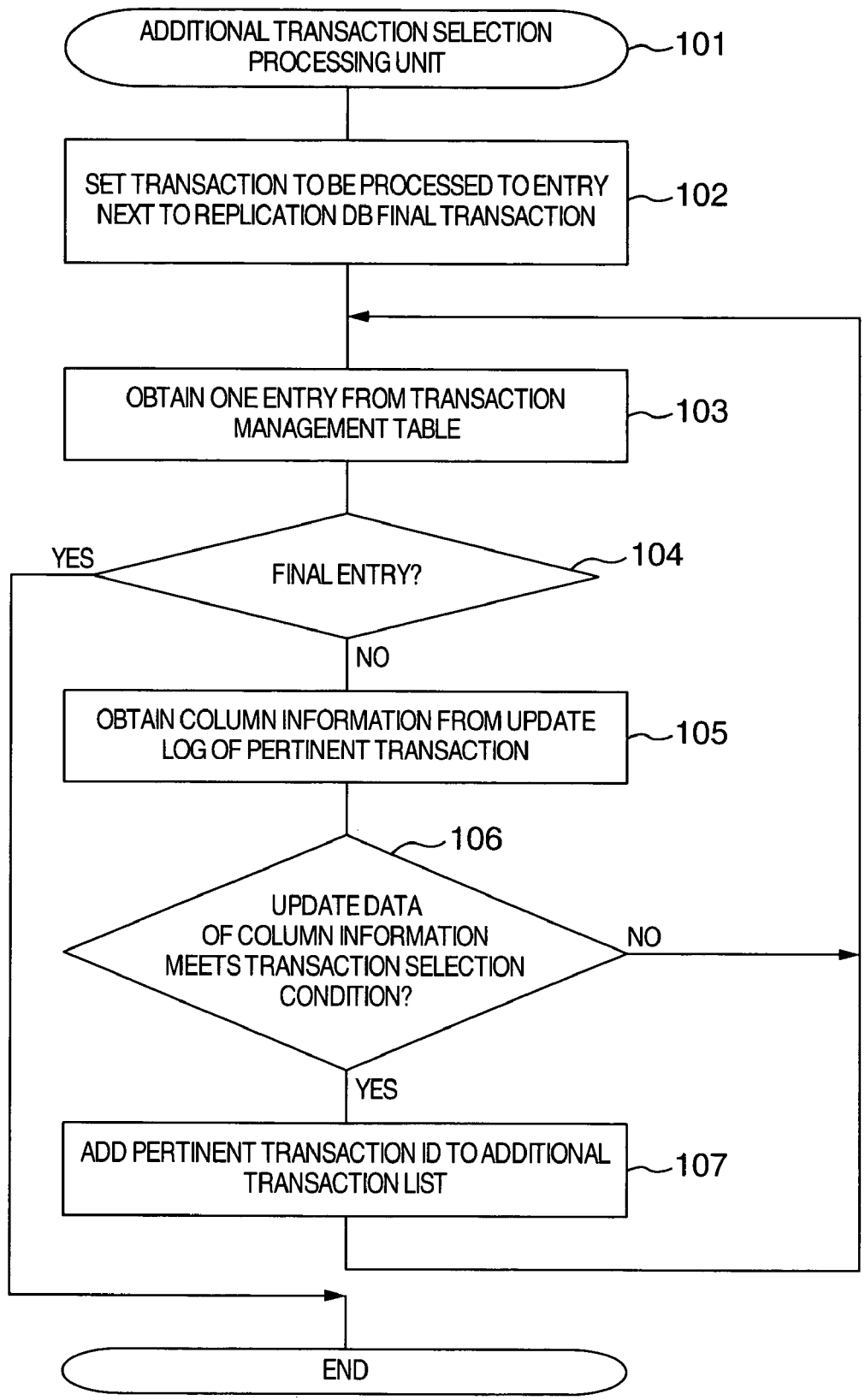
FIG. 10 is a diagram showing an additional transaction selection processing of the first embodiment.

FIG. 10 shows a flow of processing for selecting transactions to be added to the replication data base. First, an entry next to a replication DB final transaction ID42 is searched in the transaction management table (step 102), and transactions are retrieved one by one (step 103). If it is a final entry (step 104), then the processing terminates. Reference is made to the updated log of INSERT and UPDATE from among operations 472 that are performed by the retrieved transaction to obtain update information of the relevant log (step 105). If the obtained update information does not meet a transaction selection condition 66 (step 106), then the processing returns to step 103. If it meets it, the relevant transaction ID is added to an additional transaction list 43 (step 107) and the processing returns to step 103.

Figure 11:
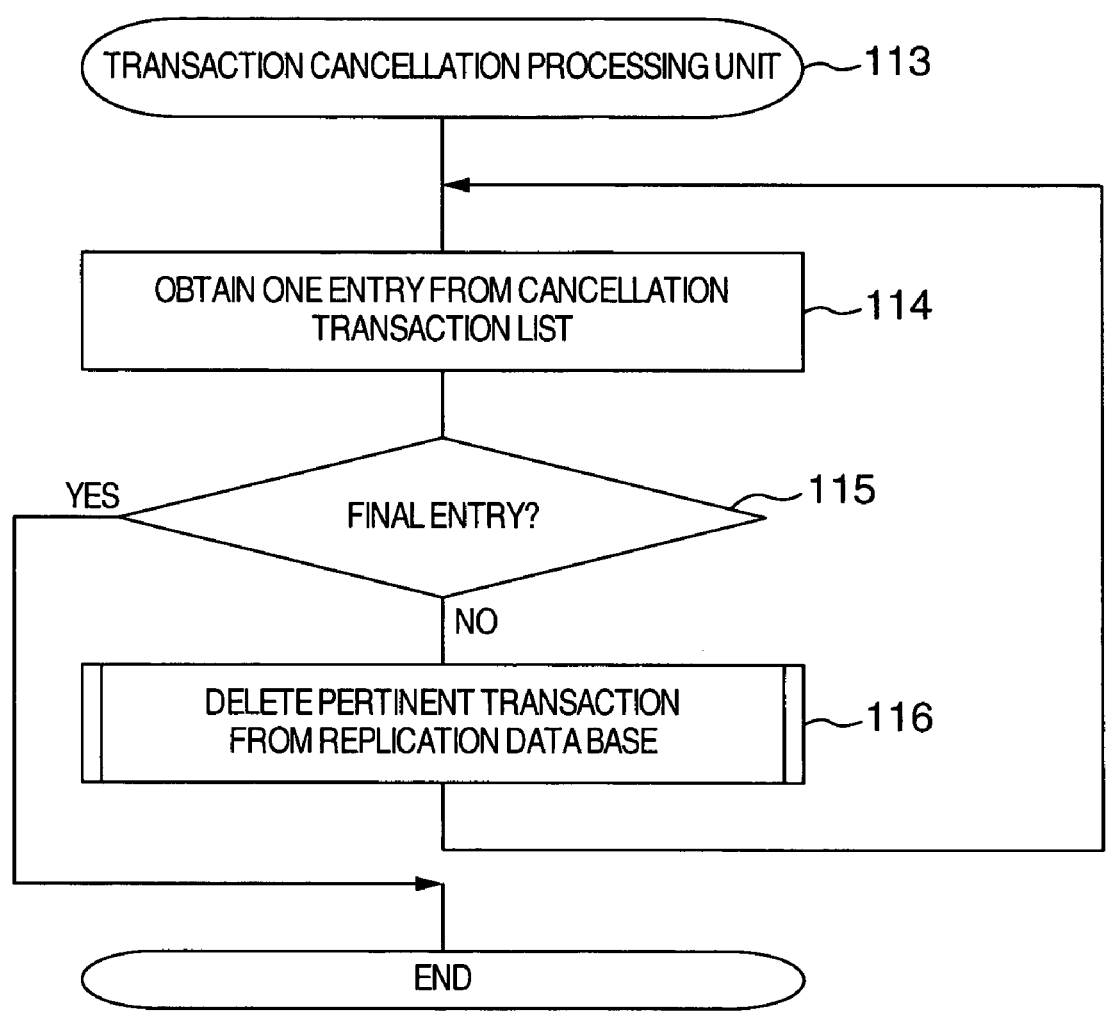
FIG. 11 is a diagrams showing transaction cancellation processing of the first embodiment.

FIG. 11 shows a flow of processing for canceling transaction from a replication data base. First, one transaction ID is obtained from a cancellation transaction list 41 (step 114). If it is a final entry, the processing terminates (step 115). After transaction cancellation processing 113 is performed, and a retrieved transaction is cancelled from the replication data base (step 116), the processing returns to step 114.

Figure 12:
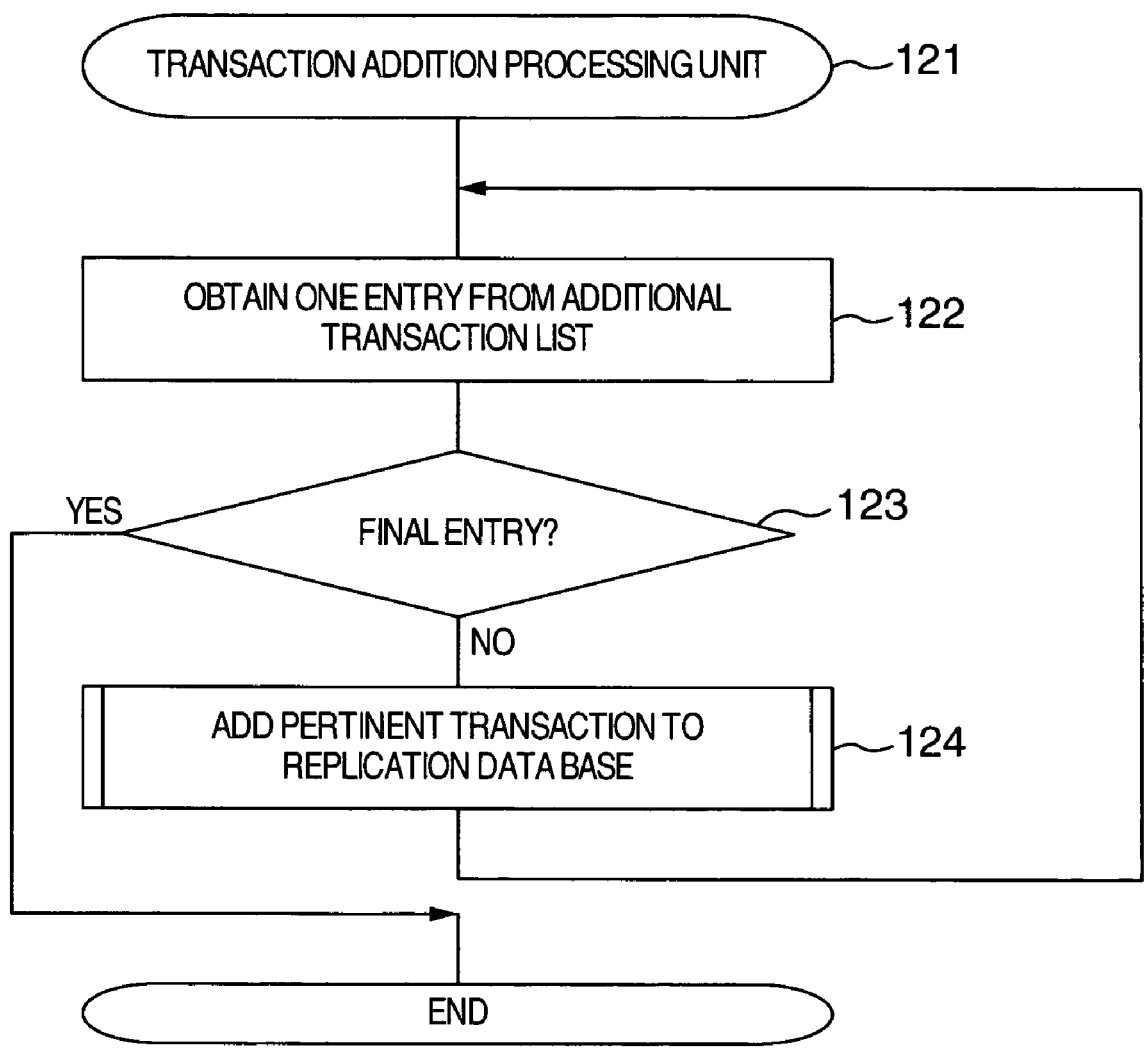
FIG. 12 is a diagram showing transaction addition processing of the first embodiment.

FIG. 12 shows a flow of processing for adding transaction to the replication data base. First, one transaction ID is obtained from the additional transaction list 43 (step 122). If it is a final entry, the processing terminates (step 123). The retrieved transaction IDs are operated one by one, an update content is copied to the replication data base (step 124), and then the processing returns to step 122.

Figure 13:
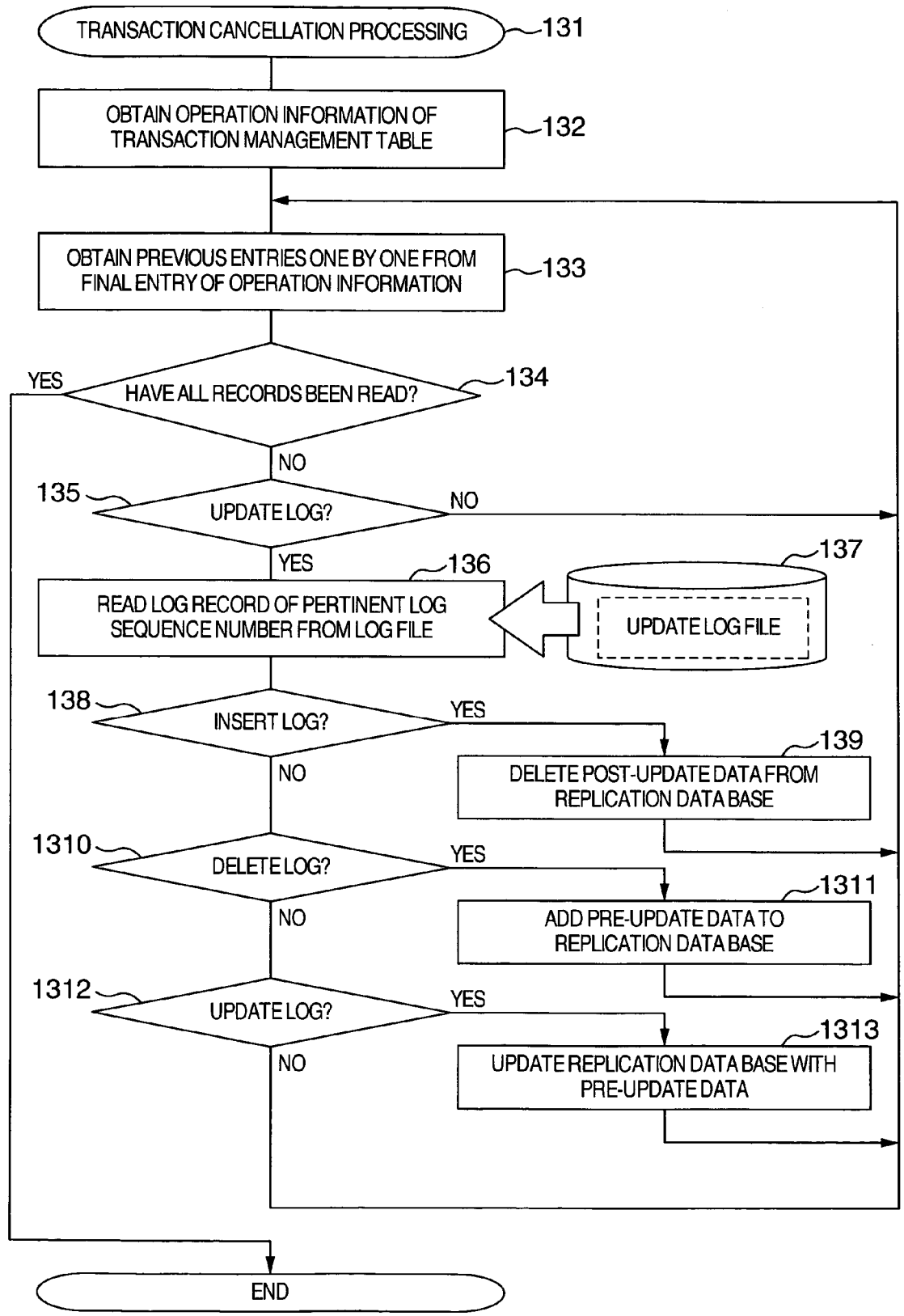
FIG. 13 is a diagram showing a detail of transaction cancellation processing of the first embodiment.

FIG. 13 shows a flow of processing for canceling one transaction from the replication data base. First, operation information 47 of the pertinent transaction is obtained from the transaction management table (step 132). Next, entries are obtained one by one from behind the operation information 47 (step 133). When all entries are processed (step 134), the processing terminates. When the operation cord 472 of an obtained entry is other than INSERT, DLETE, or UPDATE (step 135), the processing returns to step 133. Next, a log record of the log sequence number 471 of the obtained entries is obtained from an update log file 137 (step 136). When the obtained log is an INSERT log (step 138), post-update data 3534 is DELETED from the replication data base (step 139), and the processing returns to step 133. When the obtained update log is a DELETE log (step 1310), pre-update data 3533 is INSERTED into the replication data base (step 1311), and the processing returns to step 133. When the obtained update log is an UPDATE log (step 1312), the replication data base is UPDATED by the pre-update data 3533 (step 1313), and the processing returns to step 133.

The first embodiment has been described in the above, and advantages thereof will be described in the following sections.

First, when utilizing the replication data base for various purposes, including batch processing, back up, or the like, it is possible to significantly reduce the burden of data preparations required of the application. More specifically, the transaction selection processing 29 makes it possible to change an update state of the once created replication data base in accordance with an arbitrary condition. For example, it is possible to cancel the already updated content of the batch processing, which is handled the next day, after the replication data base is made. Conversely, it is also possible to copy the update content of the batch processing, which is handled on that day and is not copied yet, to the replication data base.

Second, operational flexibility will be enhanced. For example, even in the event that works to be handled on that day and works to be handled the next day are mixed, since working hours can not be clearly separated, the transaction selection processing 29 makes it possible to create a replication data base in which the processing of the works to be handled on that day is in a state of completion. Moreover, the state of the replication data base can be changed any number of times at arbitrary times.

Third, the state of the replication data base can be changed without affecting the online work. This is because the transaction selection processing 29 updates the replication data base using the update log.

(Embodiment 2)

A description will be given below to embodiment 2, in which selection of transaction, and update processing of the replication data base are performed by an external storage device in stead of an information processing apparatus.

Figure 14:
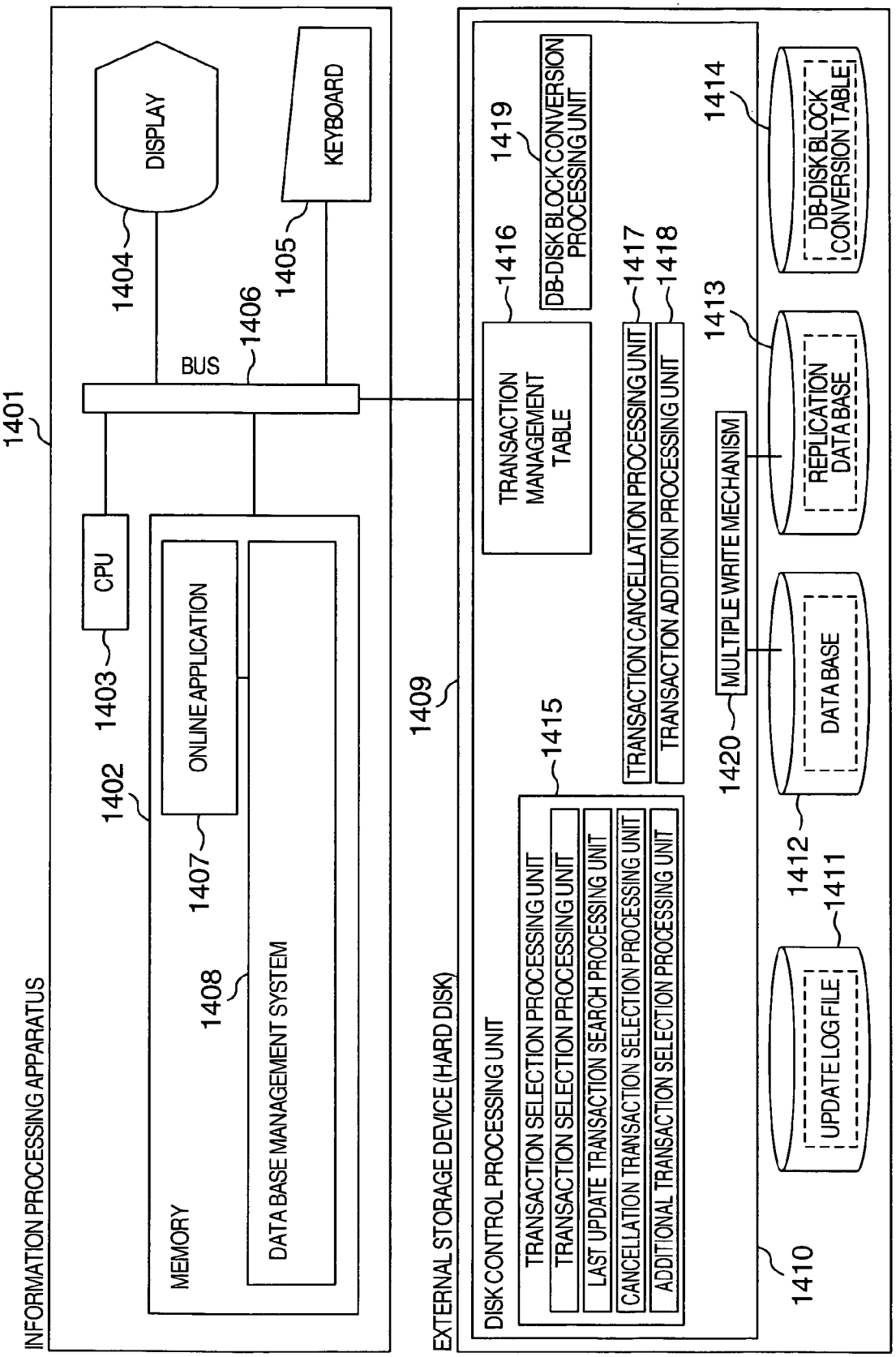
FIG. 14 is a diagram showing a system configuration of a second embodiment.

FIG. 14 shows a configuration of an information processing apparatus of embodiment 2 according to the present invention. In the embodiment, a system is implemented by an information processing apparatus 1401 and an external storage device 1409, which are connected by a bus 1406. The information processing apparatus 1401 comprises: a CPU 1403; a memory 1402; a display 1404; and a keyboard 1405. An online application 1407 on the memory 1402 accesses a data base 1412 on the external storage device 1409 via a data base management system 1408. The update content of the data base 1412 can be recorded on an update log file 1411 as update history information, and copied to a replication data base 1413 by a multiple write mechanism 1420 on a disk control processing unit 1410. The multiple write mechanism 1420 can also release the multiple write at an arbitrary point in time, and allows the replication data base 1413 to be read and written as a data base that is independent from the data base 1412 via the data management system 1408. The disk control processing unit 1410 includes: a transaction selection processing unit 1415 for selecting a transaction that meets a certain condition from the update log file 1411; a transaction management table 1416 for managing the transaction; a transaction cancellation processing unit 1417 for canceling the transaction that does not meet the condition from the replication data base 1413; and a transaction addition processing unit 1418 for adding the transaction that meets the condition to the replication data base 1413. When updating the content of transaction processing, which is performed to the replication data base 1413, the transaction cancellation processing unit 1417 and transaction addition processing unit 1418 use a DB-disk block conversion table 1414 which indicates a relative relationship between logical position information of a transaction, which is recognized by data base processing on the information processing apparatus 1401 side, and physical position information on the external storage device 1409 to convert the position information indicated in the update log file 1411 to physical position information on the external storage device 1409. Then, they update the data of the replication data base 1413 on the external storage device 1409, which is represented by the converted physical position information, in accordance with the content of the update log file 1411. The DB-disk block conversion processing unit 1419 utilizes the DB-disk block conversion table 1414 as conversion information.

Figure 15:
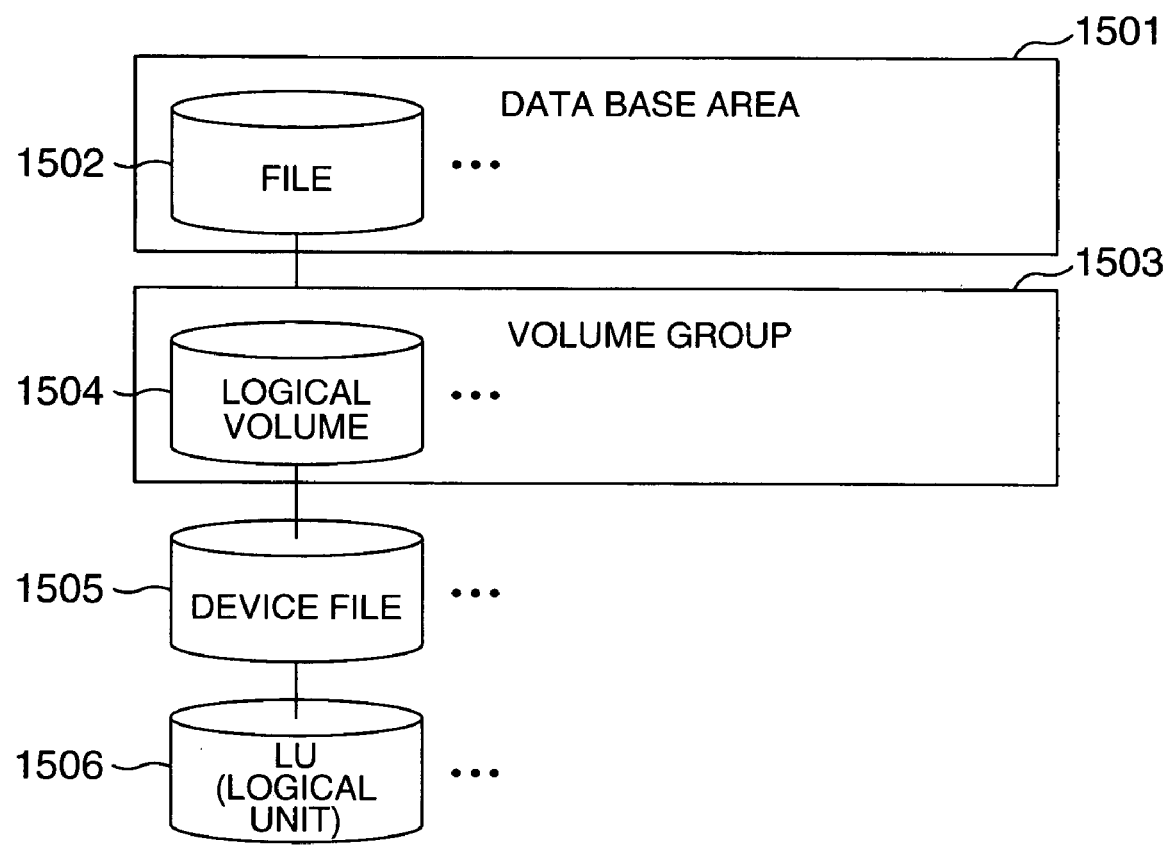
FIG. 15 is a diagram showing a DB-disk configuration of the second embodiment.

FIG. 15 is a diagram showing a relationship between logical information of a DB and physical information of a disk. More specifically, it is a diagram showing an example of a relationship of a data base area which is recognized on the information processing apparatus 1401, a logical volume 1504 which is recognized by an operating system, and mapping of a device file 1505 on an LU1506 within the external storage apparatus 1409. As FIG. 15 shows, in the data base management system 1408, a data base area 1501 where data is stored is recognized to comprise a plurality of files 1502. Each constituent file 1502 corresponds to the file of an operating system on the information processing apparatus 1401. In FIG. 15, a case is assumed in which each constituent file 1502 is recognized as a RAW device in the operating system. Moreover, the file of the operating system is managed as a device file 1505 that corresponds to a physical magnet disk device, and the device file is mapped to a LU (Logical Unit) 1506 that corresponds to each magnetic disk device within the external storage device 1409, as described above.

FIG. 16 shows a configuration of a DB-disk block conversion table. As FIG. 16 shows, the DB-disk block conversion table 1414 includes: data base area ID 1601 for identifying a data base area 1501; file ID 1602 for indicating the sequence number of files when the data base area, which is identified by the data base ID, comprises a plurality of files; block length 1603 for indicating the length of a block that constitutes the foregoing data base area; a logical volume ID 1604 that is information for identifying the logical volume, in which the file that constitutes the foregoing data base area is secured; disk control device number 1605 that is a number for identifying an external storage device to which a logical volume is mapped that is identified by the logical volume ID; physical device ID 1606 that is information for identifying a drive number of a magnetic disk device, to which the logical volume is mapped, in the magnetic disk device of the external storage device which are identified by the disk control device number; and relative position 1607 for indicating a relative position of a relevant file on the magnetic disk device which is identified by the physical device ID.

In the external storage device 1409, the device file 1505 corresponds to the LU 1506. Therefore, the file, which constitutes the data base area 1501, is finally mapped to a magnetic disk device which is a physical device. Corresponding physical information is a physical device ID for identifying a physical device on the external storage device 1409, and an LBA (Logical Block Address), which is a relative position within the physical device.

Next, a description will be given to a difference in the flow of processing between the first embodiment and the second embodiment. While in the first embodiment, the transaction selection processing 1415 was operated on the information processing apparatus 1401 side by the transaction selection processing activation 29, in the second embodiment, it is operated on the external storage device 1409. Furthermore, in update processing of the replication data base 1413 in the transaction cancellation processing unit 1417 and transaction addition processing unit 1418 (step 116, and step 124), logical position information, which is indicated in the update log file 1411, is converted to physical position information on the external storage device 1409 by referring to the DB-disk block conversion table 1414 shown in FIG. 16 and identifying a disk control device number of a corresponding disk, a drive number, and a page number. Then, the data of the replication data base 1413 on the external storage device 1409, which is represented by the converted physical position information, is updated in accordance with the content of the update log file 1411. More specifically, the DB-disk block conversion table 1414 is searched for a file ID which is included in the pertinent log information and a record that matches the data base area ID to acquire a pertinent disk device number, drive number, and relative position. Thereafter, assuming the relative position is the head of the file, the page number of the log information is converted to the page number on the physical disk.

According to the information processing apparatus described in the second embodiment, when updating the replication data base by the transaction selection processing 29, not only the burden of input/output processing between the information processing apparatus and external storage device, but also the amount of memory resource consumed by the information processing apparatus and the usage of CPU are reduced, thus making it possible to minimize the effect on online work.

(Embodiment 3)

Figure 17:
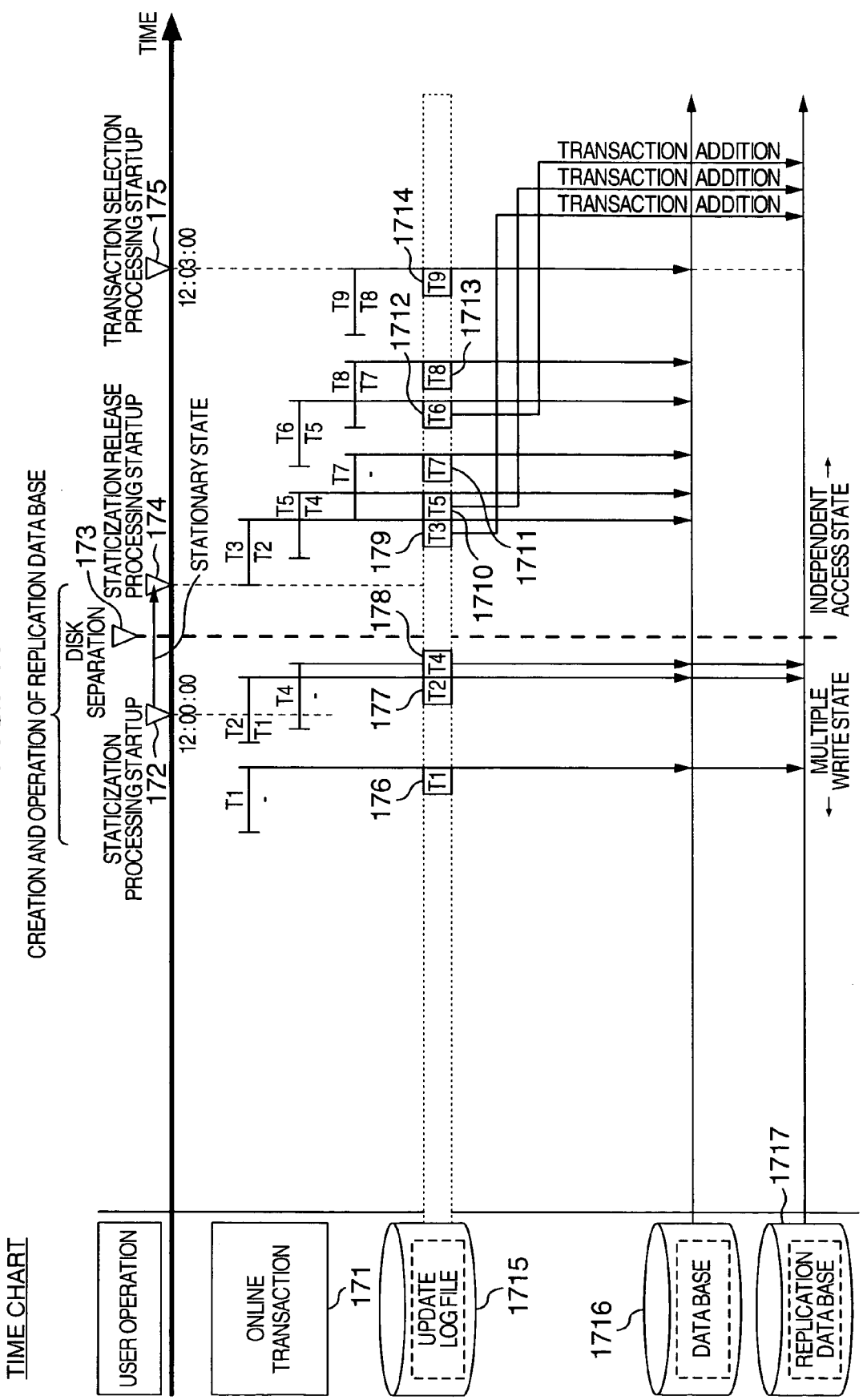
FIG. 17 shows a time chart of a third embodiment.

FIG. 17 is another time chart of the first embodiment according to the present invention. The embodiment shows a case in which there is an association between transactions in an online transaction 171. More specifically, a transaction T2 (177) performs processing based on the result of processing of a transaction T1 (176), and a transaction T3 (179) performs processing based on the result of processing of the transaction T2 (177). In such operations, if a replication 1717 of a data base 1716 is created by creating and operating the replication data base at an arbitrary time (steps 172, 173, and 174), some of the associated transactions may not be copied to the replication data base, thus making it impossible to assure the association between the transactions on the replication data base side.

In the present embodiment, the association between transactions on the replication data base side is assured by following processing steps. When the associated transactions are performed before the replication DB final transaction 42 in a transaction selection condition 66 determination step 106 of an additional transaction selection processing unit 11114, a pertinent transaction is selected as an additional transaction. Optionally, when associated transactions are performed later than the replication DB final transaction 42 in a transaction selection condition 66 determination step 94 of a cancellation transaction selection processing unit 11113, a pertinent transaction is selected as a cancellation transaction.

Above described information processing apparatus of the third embodiment pays attention to the association between transactions to copy the associated transactions to the replication data base without separating them. Thus, it becomes possible to assure the association between transactions on the replication data base side.

With the foregoing, burdens of data preparation and operation for batch work, such as aggregate processing of a large volume of data, can be significantly reduced in the work processing that requires a 24-hour continued operation. Especially in a SAN environment, an additional function, such as a high-speed copying function that an external storage device side has, can be utilized to minimize the effect on the online work.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A data processing method in a storage device that has a replication generation function for replicating a data base to create a replication data base, and stores data and a plurality of log information in transaction processing that uses said data, wherein a transaction is selected that is performing a data operation without meeting a predetermined condition after the synchronization between said data base and said replication data base is released, and cancellation processing of the data operation is performed to said replication data base with said selected transaction, or a transaction is selected that meets said predetermined condition and is not performing the data operation to said replication data base, and the data operation is performed to the replication data base with said selected transaction, wherein said predetermined condition is defined in accordance with a plurality of timestamps successively assigned to each of the plurality of transactions with log information so that some of said transactions, which do not meet said predetermined condition, are deleted from the replication database even though said some of said transactions have already been processed before release of the database and the replication database, while others of said transactions, which do meet said predetermined condition, are added into the replication database even though said others of said transactions have been processed after the release of the database and the replication database.

2. A data processing method according to claim 1, wherein the plurality of time stamps indicate whether each of the transactions is to be processed on a predetermined day or on a day other than the predetermined day such that the predetermined condition is that the transaction is assigned, by the timestamp, to be processed on the predetermined day.

3. A data processing apparatus that has a storage device having a replication generation function for replicating a data base to create a replication data base, and stores data and a plurality of log information in transaction processing that uses said data in said storage device, said apparatus further comprising:

means for detecting the release of synchronization between said data base and said replication data base; and means for, upon detection of the release of said synchronization, selecting a transaction that is performing a data operation to said replication data base without meeting a predetermined condition to perform the data operation cancellation processing to said replication data base with said selected transaction, or selecting a transaction that meets said predetermined condition and is not performing the data operation to said replication data base to perform a data operation to said replication data base with said selected transaction, wherein said predetermined condition is defined in accordance with a plurality of timestamps successively assigned to each of the plurality of transactions with log information so that some of said transactions, which do not meet said predetermined condition, are deleted from the replication database even though said some of said transactions have already been processed before release of the database and the replication database, while others of said transactions, which do meet said predetermined condition, are added into the replication database even though said others of said transactions have been processed after the release of the database and the replication database.

4. A data processing apparatus according to claim 3 wherein the plurality of time stamps indicate whether each of the transactions is to be processed on a predetermined day or on a day other than the predetermined day such that the predetermined condition is that the transaction is assigned, by the timestamp, to be processed on the predetermined day.

5. A storage device that has a replication generation function for replicating a data base to create a replication data base, and stores data and a plurality of log information in transaction processing that uses said data, said device further comprising:

means for releasing synchronization between said data base and said replication data base; and means, when said synchronization is released, for selecting a transaction that is performing a data operation to said replication data base without meeting a predetermined condition to perform the data operation cancellation processing to said replication data base with said selected transaction, or selecting a transaction that meets said predetermined condition and is not performing the data operation to said replication data base to perform a data operation to said replication data base with said selected transaction, wherein said predetermined condition is defined in accordance with a plurality of timestamps successively assigned to each of the plurality of transactions with log information so that some of said transactions, which do not meet said predetermined condition, are deleted from the replication database even though said some of said transactions have already been processed before release of the database and the replication database, while others of said transactions, which do meet said predetermined condition, are added into the replication database even though said others of said transactions have been processed after the release of the database and the replication database.

6. A storage device according to claim 5 wherein the plurality of time stamps indicate whether each of the transactions is to be processed on a predetermined day or on a day other than the predetermined day such that the predetermined condition is that the transaction is assigned, by the timestamp, to be processed on the predetermined day.

7. A data processing program for causing a data processing apparatus, which has a storage device having a replication generation function for replicating a data base to create a replication data base, to function such that it stores data and a plurality of log information in transaction processing that uses said data, said data processing program further comprising:

a step of releasing said synchronization between said data base and said replication data base; and a step, upon detection of the release of said synchronization, of selecting a transaction that is performing a data operation to said replication data base without meeting a predetermined condition to perform the data operation cancellation processing to said replication data base with said selected transaction, or selecting a transaction that meets said predetermined condition and is not performing a data operation to said replication data base to perform the data operation to said replication data base with said selected transaction, wherein said predetermined condition is defined in accordance with a plurality of timestamps successively assigned to each of the plurality of transactions with log information so that some of said transactions, which do not meet said predetermined condition, are deleted from the replication database even though said some of said transactions have already been processed before release of the database and the replication database, while others of said transactions, which do meet said predetermined condition, are added into the replication database even though said others of said transactions have been processed after the release of the database and the replication database.

8. A data processing program according to claim 7 wherein the plurality of time stamps indicate whether each of the transactions is to be processed on a predetermined day or on a day other than the predetermined day such that the predetermined condition is that the transaction is assigned, by the timestamp, to be processed on the predetermined day.

9. A data processing program for causing a data processing apparatus, which has a storage device having a replication generation function for replicating a data base to create a replication data base, to function such that it stores data and a plurality of log information in transaction processing that uses said data, said data processing program comprising:

a step of releasing said synchronization between said data base and said replication data base; and a step, upon releasing said synchronization, of selecting a transaction that is performing a data operation to said replication data base without meeting a predetermined condition to perform the data operation cancellation processing to said replication data base with said selected transaction, or selecting a transaction that meets said predetermined condition and is not performing a data operation to said replication data base to perform the data operation to said replication data base with said selected transaction, wherein said predetermined condition is defined in accordance with a plurality of timestamps successively assigned to each of the plurality of transactions with log information so that some of said transactions, which do not meet said predetermined condition, are deleted from the replication database even though said some of said transactions have already been processed before release of the database and the replication database, while others of said transactions, which do meet said predetermined condition, are added into the replication database even though said others of said transactions have been processed after the release of the database and the replication database.

10. A data processing program according to claim 9 wherein the plurality of time stamps indicate whether each of the transactions is to be processed on a predetermined day or on a day other than the predetermined day such that the predetermined condition is that the transaction is assigned, by the timestamp, to be processed on the predetermined day.

11. A data processing apparatus that has a storage device which has a replication generation function for replicating a data base to create a replication data base, and stores data and a plurality of log information in transaction processing that uses said data, said apparatus further comprising:

means for detecting the release of synchronization between said data base and said replication data base; and means for, upon detection of the release of said synchronization, selecting a transaction, in which the time of a timestamp carried by a work processing request is after the completion of the work processing and a data operation to said data base is being performed before the start of said synchronization, to perform the data operation cancellation processing to said replication data base with said selected transaction, or selecting a transaction, in which the time of the timestamp carried by the work processing request is before the completion time of said work processing request and a data operation to said data base is being performed after the release of said synchronization to perform a data operation to said replication data base with said selected transaction, wherein said predetermined condition is defined in accordance with a plurality of timestamps successively assigned to each of the plurality of transactions with log information so that some of said transactions, which do not meet said predetermined condition, are deleted from the replication database even though said some of said transactions have already been processed before release of the database and the replication database, while others of said transactions, which do meet said predetermined condition, are added into the replication database even though said others of said transactions have been processed after the release of the database and the replication database.

12. A data processing apparatus according to claim 11 wherein the plurality of time stamps indicate whether each of the transactions is to be processed on a predetermined day or on a day other than the predetermined day such that the predetermined condition is that the transaction is assigned, by the timestamp, to be processed on the predetermined day.

13. A data processing method in a data processing apparatus that has a storage device comprising the steps of:

replicating data having been stored in a database to a replication database, the data replicated to the replication database being divided into a plurality of transactions respectively having log information in transaction processing which utilizes said data, judging whether or not synchronization between said database and said replication database is released, processing data operations for said database after the database and the replication database have been released;

further judging, at the data processing apparatus, whether or not a transaction selection processing is requested; and deleting transactions, from the replication database that do not meet a predetermined condition defined in accordance with a plurality of timestamps successively assigned to each of the plurality of transactions with log information, even if the transactions have been processed before a release of the database and the replication database, while adding transactions, into the replication database, which meet the predetermined condition even if the transactions have been processed after the release of the database and the replication database.

14. The data processing method according to claim 13, said method further comprising a step of adding to said replication data base a transaction which meets another predetermined condition when it is being processed at the time of said release of synchronization.

15. The data processing method according to claim 14, wherein said another predetermined condition is based on an insert log and an update log which are generated in said transaction processing under way.

16. A data processing method according to claim 13 wherein the plurality of time stamps indicate whether each of the transactions is to be processed on a predetermined day or on a day other than the predetermined day such that the predetermined condition is that the transaction is assigned, by the timestamp, to be processed on the predetermined day.

17. A data processing method in a data processing apparatus that has a storage device comprising the steps of:

replicating data having been stored in a database to a replication database, the data replicated to the replication database being divided into a plurality of transactions respectively having log information in transaction processing which utilizes said data, judging whether or not synchronization between said database and said replication database is released, processing data operations for said database after the database and the replication database have been released;

further judging, at the data processing apparatus, whether or not a transaction selection processing is requested;

deleting transactions that do not meet a predetermined condition defined in accordance with a plurality of timestamps successively assigned to each of the plurality of transactions with log information, even if the transactions have been processed before a release of the database and the replication database, while adding transactions, into the replication database, which meet the predetermined condition, even if the transactions have been processed after the release of the database and the replication database, the transactions being arranged to be stored by associating an identifier of a sub-transaction derived from a processing result of the transactions, and a determination of the transactions being performed according to both the transactions and the sub-transactions.

18. A data processing method according to claim 17 wherein the plurality of time stamps indicate whether each of the transactions is to be processed on a predetermined day or on a day other than the predetermined day such that the predetermined condition is that the transaction is assigned, by the timestamp, to be processed on the predetermined day.

19. A data processing apparatus comprising:

a pair of database and a replication database adapted to store data, the data stored in both database and the replication database being divided into a plurality of transactions respectively having log information in transaction processing which utilizes the data;

a first judging unit adapted to judge whether or not synchronization between the database and the replication database is released;

a processing unit adapted to perform data operations for the database after the database and the replication database have been released;

a second judging unit adapted to judge whether or not a transaction selection processing is requested; and a controlling unit adapted to control both the database and the replication database so as to delete transactions, from the replication database, which do not meet a predetermined condition defined in accordance with a plurality of timestamps successively assigned to each of the plurality of transactions with log information even if the transactions have been processed before a release of the database and the replication database, while so as to add transactions to the replication database, which meet the predetermined condition even if the transactions have been processed after the release of the database and the replication database.

20. A data processing apparatus according to claim 19 wherein the plurality of time stamps indicate whether each of the transactions is to be processed on a predetermined day or on a day other than the predetermined day such that the predetermined condition is that the transaction is assigned, by the timestamp, to be processed on the predetermined day.

* * * * *